United States Patent [19]
Rhodes et al.

[11] 3,968,254
[45] July 6, 1976

[54] METHOD OF PREPARING FEED GRAIN COMPOSITIONS

[75] Inventors: Robert A. Rhodes; William L. Orton; Bernard A. Weiner, all of Peoria, Ill.

[73] Assignee: The United States of America as represented by the Secretary of Agriculture, Washington, D.C.

[22] Filed: June 23, 1975

[21] Appl. No.: 589,656

[52] U.S. Cl. .................................. 426/18; 426/623; 426/807
[51] Int. Cl.² .......................................... A23K 1/00
[58] Field of Search ............... 426/2, 18, 52, 53, 54, 426/49, 44, 69, 623, 630, 635, 641, 416, 422, 460, 805, 807

[56] References Cited
UNITED STATES PATENTS

| | | | |
|---|---|---|---|
| 3,503,751 | 3/1970 | Durham | 426/2 |
| 3,633,547 | 1/1972 | Stevens | 426/54 |
| 3,846,558 | 11/1974 | Stevens | 195/142 |
| 3,846,559 | 11/1974 | Stevens | 426/2 |

*Primary Examiner*—A. Louis Monacell
*Assistant Examiner*—R. B. Penland
*Attorney, Agent, or Firm*—M. Howard Silverstein; David G. McConnell

[57] ABSTRACT

Feed grain compositions are prepared from grain and feedlot wastes by fermentation procedures which are carried out in simple equipment suitable for use on the feedlot site. The procedures are also suitable for industrial scale operations. Fecal odor of the waste is quickly eliminated and replaced by one that resembles the odor of silage. The fermented product has significantly more crude protein than corn, and it is palatable to livestock.

10 Claims, No Drawings

METHOD OF PREPARING FEED GRAIN COMPOSITIONS

BACKGROUND OF THE INVENTION

This invention relates to a method of preparing feed grain compositions for livestock. More specifically, it relates to a process involving the fermentation of a mixture of animal wastes and grain.

Animal production based on confinement of animals in large groups means that animal wastes also are confined. This waste can be considered a raw material whose on-site concentration allows continuous collection and processing. For example, animal wastes contain sufficient nitrogen in the form of protein (ca. 20% of total N) and in forms readily convertible by microorganisms to protein (urea and ammonia nitrogen constitute ca. 30% of total N) to be potentially useful as a nutrient source for feeds.

Animal wastes have been collected and refed without further treatment to the same or different species, generally as a nitrogen source. These studies have been discussed by Anthony (J. Anim. Sci. 32: 4, 799–802, 1971) and extensively reviewed in detail by Smith ("Recycling Animal Wastes as a Protein Source," Symposium on Alternate Sources of Protein for Animal Production, Amer. Soc. Anim. Sci. and Committee on Animal Nutrition, Nat. Res., 1972; and "Nutritive Evaluations of Animal Manures," pages 55–74, In: G. E. Inglett, ed., Symposium: Processing Agricultural and Municipal Wastes, Avi Publishing Company, Westport, Connecticut).

In his report, Anthony stated that "it is detrimental to feed quality if manure is even partially decomposed by ubiquitous aerobic microorganisms."

In contrast to direct refeeding, feedlot manure has been ensiled (an anaerobic fermentation) with roughage (57 manure:43 hay, w/w; ca. 20% manure, dry basis) and termed Wastelage (Anthony, Proc., Conf. on Animal Waste Mangement, Cornell University, Ithaca, New York, pages 105–113, 1969; and Livestock Waste Management and Pollution Abatement, Proc. Int. Symposium on Livestock Wastes, Amer. Soc. Agri. Engineers, St. Joseph, Michigan, pages 293–296). The ensiled mixture fed at 40% of a corn ration afforded satisfactory gains, although feed:gain ratios are somewhat higher than with control rations. An anaerobic lactic fermentation of whole manure neutralized with anhydrous ammonia also has been reported (Moore and Anthony, J. Anim. Sci. 30: 2, 324, 1970), and acid treatment of the cellulosic fraction of manure to provide a substrate for yeast production has been proposed (Singh and Anthony, J. Anim. Sci. 27: 4, 1136, 1968).

We have found a method of preparing animal feed compositions comprising the steps
 a. mixing from 2 to 15 parts, dry weight basis (dwb) of animal feedlot waste (FDW) with 100 parts dwb of fragmented grain (FG) and an amount of water such that the resulting mixture contains from 35% to 45% moisture; and
 b. aerobically fermenting the mixture resulting from step (a) while submitting the mixture to a tumbling action for a time sufficient to obtain a pH in the mixture of from 4 to 5.

A major advantage of the above method is the simplicity of operation. Each step can be accomplished on the feedlot site in easily obtainable and relatively inexpensive equipment. Daily production of waste can be used up quickly so that the problems of waste accumulation are eliminated. The product, when dried to ordinary corn storage conditions, can be stored in the same manner as corn.

Another major advantage is that the fermentation is aerobic and does not require the controls necessary to anaerobic fermentations. No pH control is necessary.

Microorganism growth is selective to lactobacilli while coliform and other organisms found in feedlot waste are eliminated. Within a short time after fermentation begins, fecal odor disappears and is replaced by a more pleasant silage-like odor. Possible health and pollution hazards inherent in the waste are reduced in the early stages of fermentation. Most of the nitrogen contained in the waste is conserved while the waste is converted to a feed having more more desirable amino acid compositions.

DETAILED DESCRIPTION OF THE INVENTION

The process is simple and is adaptable to both small and large animal units. It depends upon the fact that all livestock contain enteric bacteria including lactobacilli. Fresh wastes from the livestock inherently contain lactobacilli, usually about 1% of the total bacteria. All livestocks wastes are therefore useful as starting materials in the method of the invention. However, the discussion will be limited to feedlot wastes (FLW) which are easily collected. If economical methods of collecting other livestock wastes are discovered, they will also be suitable for use in the invention.

It is preferred that FLW used as starting materials be fresh. Weathered FLW do not yield optimum fermentations unless inoculated with lactobacilli.

The term FLW is defined herein to include the wastes from any feedlot animal such as hogs and cattle and FLW fractions such as feedlot waste liquids (FLWL) unless otherwise specified.

Hog FLW is relatively free from fibrous solids and is used directly without separation. Cattle FLW, which contains fibrous solids equaling up to 40% of total solids, also is utilized directly without separation, but it is preferable to remove the fibrous solids before mixing with the fragmented grain. Cattle FLW diluted with water to a solids content of from 3% to 20% is easily separated into a fibrous solid fraction and a liquid fraction (FLWL) containing from 2% to 15% solids.

Liquids obtained by hand squeezing the diluted waste through layers of cheesecloth or by gravity separation on a 30-mesh screen contain from 20% to 40% of total raw waste solids. Approximately 90% of readily soluble and finely dispersed solids are partitioned into the liquid upon initial separation.

Any livestock feed grain is suitable for use in accordance with the invention including corn, wheat, and milo. Since microorganisms grow on the porous starch and not the hull of the feed grain, the grain kernels must be fractured or fragmented to expose the inner starchy parts to the fermentation media. Suitable means of accomplishing this include cracking, flaking, grinding, roller milling, and hammer milling. It is preferred that the particles resulting from the fragmentation be relatively coarse.

Grain and FLW are mixed together in quantities such that there are 2 to 15 parts dry weight basis (dwb) FLW solids per 100 parts dwb fragmented grain (FG,) and that the final moisture content of the FG-FLW mixture is from 35% to 45%. Since it is desirable to utilize as much FLW as possible, a mixture containing less than 2 parts FLW per 100 parts FG would be impractical. Mixtures with more than 15 parts FLW per 100 parts FG result in poor fermentations and retention of the fecal odor.

Moisture levels significantly less than 35% are insufficient to promote fermentation while those over 45% result in agglomeration of the grain particles and reduction of the tumbling action. There is no free liquid present in the mixtures at these moisture levels. The mixtures appear dry. The preferred moisture levels are from 38% to 42%.

Diluting raw cattle FLW to from 3% to 20% solids, separating the fibrous fraction by the methods described above, and mixing the FLWL with corn in suitable ratios of FLW solids:FG dwb resulted in a moisture level of about 40%. With raw wastes it is usually necessary to add water to achieve the proper moisture content.

Incubation is carried out in a container having a configuration and motion that provides a tumbling action to the FG-FLW particles. This was accomplished in containers of various shapes which were nearly horizontal and which were rotated at a speed that carried the particles up the side of the container until they fell back, tumbling over the particles below.

Flasks mounted perpendicularly to a nearly vertical rotating board, cylindrical containers rotating about nearly horizontal axes, and the like are suitable for incubation. The containers must be open to the air so that sufficient oxygen will be provided to support the aerobic fermentation which is enhanced by the tumbling action. Cement mixers are particularly suitable. No temperature control is necessary when the fermentation is conducted at the preferred ambient temperatures of from 18° to 38° C., thereby making the method ideal for on-site use.

Control of pH is also unnecessary.

The FG-FLW mixtures have initial pH's of from about 5.5 to 7.5. During fermentation pH of the mixture decreases to a minimum of from 4 to 5 at which time (usually 24 to 36 hours) growth of lactobacilli is essentially complete. Incubation is terminated when the pH of the mixture reaches 4 to 5, preferably 4 to 4.5. The product is fed directly to the feedlot animals, or it is dried, preferably at ambient temperatures, to a 12% or less moisture content for storage.

The following examples are intended to further illustrate the invention and are not to be construed as limiting the scope of the invention which is defined by the claims, infra.

All parts and percentages disclosed herein are by weight unless otherwise specified.

EXAMPLE 1

Fresh manure was collected by hand shovel from paved areas of a commercial beef cattle feedlot where the animals were fed a typical high-energy ration based on corn (Rhodes et al., Appl. Microbiol. 24: 3, 369–377, 1972). Collected waste (about 100 kg. per collection) was stored overnight at 4° C.

Raw waste (34.5% solids) was mixed with water to provide a mixture containing 22.1% solids which was stirred to a homogenous slurry. The FLW slurry was processed on a reciprocating screen as follows: A copper screen of 30 mesh (0.33 mm. wire, 0.59 mm. openings) was fastened over a rectangular wooden frame; an open three-sided wood frame was fastened on top of the screen frame to contain the slurry. The screen assembly was held tightly over a stainless steel tray which has separated openings at the lower end to discharge liquid and solids. The entire tray-screen assembly was held at 11° from horizontal and moves with a reciprocating motion through a 2-cm. displacement at ca. 300 strokes/minute when loaded. The screen was driven through a gear box and belt by a ¼ h.p. electric motor. FLW ladled onto the high end of the screen traversed the length of the screen in about 1 minute under impetus of the screen motion. Liquid which separated from the waste through the screen drained from the receiving tray into a receiving vessel; fibrous solids migrated off the open lower end of the screen into a separate container. The FLW liquid (FLWL) containing 17.8% solids was stored at 4° C. in plastic containers until used. Fibrous solids were discarded.

Thirty-nine pounds of the FLWL was mixed with 50 pounds coarsely cracked corn having 10% moisture in a standard cement mixer having a 130-liter bowl (70 liter capacity). The mixer was belt driven through a reduction gear on a ¼ h.p. electric motor so that the chamber rotated at 0.5 r.p.m. The interior of the mixer bowl (including mixing baffles) was sand blasted and painted with a two-component epoxy paint before use to eliminate rust formation from the acid fermentation. The bowl was held at 40° from horizontal. The mixer operated at ambient temperatures (18°–38° C.). The fermentation mixture was consistently 4° to 5° C. over ambient.

Fermentation was terminated after 36 hours, and the fermented product was dried in situ by blowing 60° C. air into the opening of the bowl while it continued to rotate. The fermented grain dried to a moisture content of 12% or less in 12–14 hours. Dried product dumped freely and was bagged and held for animal tests.

Analytical results were calculated to dry weight of fermented product. Moisture was determined by drying a weighed sample at 100° C. for 24 hours. Total nitrogen determined by micro-Kjeldahl was 2.68% for FLW and 1.33% for the corn (i.e., 17% and 8% crude protein, respectively). pH of fermented product was measured on a 5-g. sample triturated in distilled water for 10 minutes.

Microbial counts were done on material prepared by blending a 5-g. sample (wet weight) for 30 seconds in 20 ml. of cold 0.1 M phosphate buffer at pH 7 and then filtering and rinsing to volume through a loose fiberglass plug in a funnel. The turbid filtrate then was serially diluted in sterile distilled water. Counts were made by spread plating 0.3 ml. of appropriate dilutions in triplicate. Eugon agar was used for total counts and EMB for coliforms (both BBL, Bioquest Division of Becton, Dickinson Co.). Eugon plates were counted after 48-hour incubation at 28° C. and coliform counts were made after 24 hours at 37° C.

Ammonia determinations were performed on filtrates prepared with distilled water. Ammonia was measured with an ion-specific electrode (Orion Co., Cambridge, Massachusetts) on the supernatant of a blended sample centrifuged at 10,000 r.p.m. for 1 hour under refrigeration and reported as $NH_3$-N, mg./g. dwb.

Results of the analysis of the above fermentation are tabulated in Table 1.

Table 1

| Analysis | Fermentation time, hours | | | |
|---|---|---|---|---|
| | 0 | 12 | 24 | 36 |
| Moisture, % | 42 | 42 | 41 | 41 |
| pH | 6.31 | 4.63 | 4.37 | 4.21 |
| Ambient temperature, °C. | 29 | 28 | 25.5 | 30 |
| Crude protein, % | 10.3 | 10.2 | 10.2 | 10.1 |
| $NH_3$-N, mg./g., dwb | 0.682 | 0.880 | 0.913 | 1.066 |
| Microbial pattern, counts/g., dwb | | | | |
| Total | $2.64 \times 10^9$ | $2.30 \times 10^9$ | $8.47 \times 10^8$ | $1.39 \times 10^9$ |
| Coliform | $1.70 \times 10^6$ | $5.30 \times 10^6$ | $3.10 \times 10^7$ | $2.70 \times 10^7$ |
| Lactobacilli | $1.47 \times 10^8$ | $7.15 \times 10^9$ | $3.97 \times 10^9$ | $2.93 \times 10^9$ |

EXAMPLE 2

Fresh cattle FLW having 42% solids was diluted with water to 24% solids and screened as described in Example 1. Thirteen pounds of FLWL (20% solids) and 13 pounds water were mixed with 50 pounds cracked corn (10% moisture, 8.0% crude protein) and fermented as described in Example 1.

Fermentation products were analyzed as described in Example 1 (Table 2).

EXAMPLE 3

Fresh cattle FLW having 34.5% solids was diluted with water to 22.1% solids and screened as described in Example 1. Thirty-six pounds of the FLWL (17.8% solids) were mixed with 50 pounds cracked corn (10% moisture) and fermented as described in Example 1. A fermentation typical of Example 1 resulted which had an initial pH of 6.1 and a final (30 hours) pH of 4.22.

EXAMPLE 4

Fresh cattle FLW having 26.0% solids was diluted with water to 18.6% solids and screened as described in Example 1. Seventeen and one-half pounds of the FLWL (16.5% solids) and 8 pounds water were mixed with 50 pounds cracked corn (10% moisture) and fermented as described in Example 1. A fermentation typical of Example 1 resulted which had an initial pH of 6.37 and a final (42 hours) pH of 4.28.

serially diluted (1:10) in 0.1% tryptone. Counts were made by spread plating 0.3 ml. of selected dilutions in triplicate.

The following media were used for counts: Eugon agar for total count, L and LBS agars for lactobacilli, Streptosel for total streptococci, KF Streptococcal with triphenyl tetrazolium chloride for fecal streptococci, Staphylococcus 110 for staphylococci, Eosin Methylene Blue (EMB) for coliforms, and Mycophil with added dihydrostreptomycin sulfate (0.2 mg./ml.), and penicillin G (330 units/ml.) for yeasts and molds. All media were BBL products (BBL, Division of Bioquest, Cockeysville, Maryland). EMB plates were incubated at 37° C. for 18 to 24 hours before counting; all other plates were counted after incubation at 28° C. for 2 days.

Apparent coliform colonies of the 24-hour sample were transferred from EMB plates to lactose broth and were examined microscopically. Colonies of lactobacilli from LBS and yeasts from Mycophil were transferred respectively to Micro Assay Culture Agar (BBL) and YM agar (Difco Laboratories, Detroit, Michigan). Isolates were incubated for 2 to 3 days at 28° C. before storing at 4° C. for subsequent examination. At each sample time, one to three plates of either the countable dilution or the next higher dilution were picked in entirety from LBS and from Mycophil (30 to 70 isolates per sample time).

A typical lactobacilli dominated fermentation resulted, Table 3.

Table 2

| Analysis | Fermentation time, hours | | | | |
|---|---|---|---|---|---|
| | 0 | 6 | 12 | 24 | 36 |
| Moisture, % | 38.7 | 38.7 | 39.0 | 39.3 | 37.0 |
| pH | 5.39 | 5.20 | 4.67 | 4.01 | 4.01 |
| Crude protein, % | 8.6 | 9.0 | 8.9 | 9.0 | 8.6 |
| $NH_3$-N, mg./g., dwb | 0.168 | 0.159 | 0.164 | 0.189 | 0.208 |
| Microbial pattern, counts/g., dwb | | | | | |
| Total | $2.78 \times 10^8$ | $1.26 \times 10^8$ | $1.97 \times 10^9$ | $1.63 \times 10^9$ | $8.65 \times 10^8$ |
| Coliform | $5.06 \times 10^6$ | $6.53 \times 10^6$ | $1.22 \times 10^6$ | $1.24 \times 10^5$ | $3.25 \times 10^5$ |

EXAMPLE 5

Cracked corn (350 g., 10% moisture) and 175 g. fresh cattle FLWL prepared as described in Example 1 to contain 28% solids were mixed in 2-liter Erlenmeyer flasks. The flasks were held at 9° from horizontal on a board rotating at 0.6 r.p.m. Incubation was at 28° C. Two 5-g. samples were taken at 1, 6, 12, 24, 48, 72, and 144 hours. One sample was triturated in 10 ml. distilled water for 10 minutes and the pH measured before drying at 100° C. for 24 hours to give the dry weight. The second sample was blended with 20 ml. cold 0.1 M phosphate buffer (pH 7.0) for 30 seconds in a Waring Blendor, filtered through a loose glass-wool plug, and

EXAMPLE 6

Fresh cattle FLW was treated as described in Example 1 to produce a FLWL having 10% solids. The FLWL (225 g.) was mixed with 390 g. of cracked milo and fermented as described in Example 5. A typical fermentation resulted which had an initial pH of 5.35 and a final (72 hours) pH of 4.4

EXAMPLES 7–16

Fresh hog FLW collected from the Wayne Peugh farm, Dunlap, Illinois, was used in the fermentation without previous treatment. Suitable amounts of FLW, water, and cracked corn were mixed in a cement mixer and fermented as described in Example 1. Fermentation conditions are listed in Table 4. Time of harvest was 36 hours, and the ambient temperature ranged from 18° to 38° C. Fermentation temperature was consistently from 3° to 5° C. higher than ambient. The initial fecal odor was always replaced by a silage-like odor soon after fermentation began.

Example 11 was sampled periodically during the fermentation, and the samples were analyzed for their microbial contents as described in Example 1. The microbial pattern is shown in Table 5.

EXAMPLE 17

Fresh hog FLW (200 g., 27% solids) was mixed with 125 ml. of water and 450 g. cracked corn (9.2% moisture) in a 2-liter flask and fermented and analyzed as described in Example 5. The unfermented corn contained 9.2% crude protein and the fermentation product contained 10.2% crude protein. Results of the analysis are shown in Table 6.

EXAMPLE 18

Products collected from several fermentations conducted as described in Example 5 were blended and offered to white Swiss mice in comparison to unfermented corn and a commercial pelleted diet. The fermented product and the unfermented corn were coarsely ground, cooked briefly in minimal amount of water to partially gelatinize the starch, and then formed into pellets. Each of the three diets was fed ad libitum for 2½ months to six mice separated in cages of three segregated by sex. Mice were weighed every 3 or 4 days; weight data are shown in Table 7. The fermented product exhibited no overt Table 3

| Analysis | Fermentation time, hours | | | | | | |
|---|---|---|---|---|---|---|---|
| | 1 | 6 | 12 | 24 | 48 | 72 | 144 |
| pH | 5.5 | 5.2 | 4.9 | 4.4 | 4.3 | 5.1 | 4.2 |
| Microbial pattern, counts/g., dwb | | | | | | | |
| Coliforms | $7.2 \times 10^6$ | $6.4 \times 10^6$ | $5.9 \times 10^6$ | 0 | 0 | 0 | 0 |
| Lactobacilli | $9.5 \times 10^6$ | $2.6 \times 10^6$ | $2.8 \times 10^8$ | $2.6 \times 10^9$ | $7.0 \times 10^8$ | $2.1 \times 10^9$ | $3.6 \times 10^9$ |
| Fecal streptococci | $1.1 \times 10^5$ | $1.8 \times 10^5$ | $4.3 \times 10^5$ | $2.7 \times 10^5$ | $10^3$ | $10^3$ | $10^2$ |
| Yeast | $10^4$ | $10^5$ | $10^6$ | $2.1 \times 10^6$ | $5.5 \times 10^6$ | $9.5 \times 10^7$ | $2.6 \times 10^7$ |

Table 4

| Example No. | Starting materials | | | | | pH | |
|---|---|---|---|---|---|---|---|
| | FLW | | Corn | | Water added Wt., lb. | Initial | At harvest |
| | Wt., lb. | Solids, % | Wt., lb. | Moisture, % | | | |
| 7 | 10.0 | 29.1 | 50.0 | 12.9 | 24.0 | 6.4 | 4.5 |
| 8 | 15.0 | 29.9 | 50.0 | 12.9 | 15.0 | 5.8 | 4.6 |
| 9 | 20.0 | 29.9 | 50.0 | 12.9 | 13.5 | 5.3 | 4.6 |
| 10 | 19.5 | 24.5 | 50.0 | 8.8 | 15.1 | 6.0 | 4.7 |
| 11 | 25.0 | 21.8 | 50.0 | 13.1 | 7.1 | 7.2 | 5.1 |
| 12 | 25.5 | 19.0 | 50.0 | 9.0 | 8.5 | 6.2 | — |
| 13 | 25.6 | 21.1 | 49.6 | 8.7 | 8.5 | 6.2 | 4.2 |
| 14 | 25.5 | 20.2 | 47.0 | 9.0 | 8.3 | — | — |
| 15 | 28.0 | 22.2 | 50.0 | 13.1 | 4.9 | — | 5.0 |
| 16 | 29.8 | 25.3 | 50.0 | 8.8 | 7.7 | — | 4.6 |

Table 5

| Microbial pattern counts/g.,dwb | Fermentation time, hours | | | | | |
|---|---|---|---|---|---|---|
| | 0 | 6 | 12 | 24 | 30 | 36 |
| Total | $3.2 \times 10^9$ | — | $1.1 \times 10^9$ | $2.3 \times 10^9$ | — | $3.6 \times 10^9$ |
| Coliform | $0.9 \times 10^6$ | — | $1.9 \times 10^6$ | — | — | $1.4 \times 10^6$ |
| Lactobacilli | $1.6 \times 10^7$ | — | $2.9 \times 10^7$ | $3.3 \times 10^9$ | — | $2.2 \times 10^9$ |
| Yeasts | $2.1 \times 10^5$ | — | $1.8 \times 10^3$ | $1.5 \times 10^5$ | — | $3.9 \times 10^5$ |

Table 6

| Analysis | Fermentation time, hours | | | | |
|---|---|---|---|---|---|
| | 0 | 12 | 24 | 36 | 48 |
| Moisture, % | 38.9 | 38.0 | 40.2 | 39.6 | 40.2 |
| pH | 5.95 | 4.88 | 4.61 | 4.50 | 4.50 |
| Crude protein, % | 10.2 | 10.1 | 10.4 | 10.4 | 10.2 |
| NH$_3$-N, mg./g., dwb | 0.144 | 0.177 | 0.160 | 0.169 | 0.202 |
| Microbial pattern, counts/g., dwb | | | | | |
| Total | $1.4 \times 10^9$ | $6.9 \times 10^8$ | $1.2 \times 10^9$ | $7.4 \times 10^8$ | $3.2 \times 10^8$ |
| Coliform | $7.0 \times 10^6$ | $3.2 \times 10^5$ | $5.0 \times 10^5$ | $2.8 \times 10^6$ | $3.9 \times 10^6$ |
| Lactobacilli | $4.0 \times 10^7$ | $6.0 \times 10^8$ | $9.2 \times 10^8$ | $6.5 \times 10^8$ | $6.0 \times 10^8$ |
| Yeasts | $2.8 \times 10^5$ | $2.4 \times 10^5$ | $4.7 \times 10^3$ | $6.5 \times 10^3$ | $4.0 \times 10^6$ | toxicity to mice and consumption afforded equal growth rates compared to corn.

Table 7

| Diet | Days on diet, avg. weight in grams | | | | |
|---|---|---|---|---|---|
| | 1 | 10 | 21 | 42 | 74 |
| Unfermented corn | 14.7 | 15.6 | 17.6 | 20.0 | 23.3 |
| Fermented corn-FLWL | 14.8 | 15.1 | 15.7 | 20.2 | 21.9 |
| Commercial feed | 13.0 | 22.1 | 28.0 | 33.2 | 34.9 |

EXAMPLE 18

Products (FG-FLW) from Examples 7 through 16 were combined and mixed in a twin shell blendor, mixed with hay, and fed to sheep in an acceptance-palatability test. Control sheep were fed a hay-cracked corn mixture. Acceptance and palatability were determined by measuring the total amount of feed unconsumed (weigh back) over a 10-day period (Table 8).

Table 8

| Control | Hay, g. | Cracked corn, g. | Weigh back, g. |
|---|---|---|---|
| | 2,841 | 3,000 | 8,800 | 1,405 |
| | 2,856 | 3,000 | 10,800 | — |
| | 2,868 | 3,000 | 10,400 | 307 |
| | 7,295 | 3,000 | 10,600 | 694 |
| Mean | | 3,000 | 10,150 | 602 |

| Experimental | Hay, g. | FG-FLW, g. | Weigh back, g. |
|---|---|---|---|
| | 2,848 | 3,000 | 10,800 | 5 |
| | 2,854 | 3,000 | 10,800 | — |
| | 2,859 | 3,000 | 10,800 | — |
| | 7,294 | 3,000 | 10,800 | 61 |
| Mean | | 3,000 | 10,800 | 17 |

EXAMPLE 19

The combined FG-FLW described in Example 18 was used to replace corn in a standard hen (control) diet (Table 9).

Table 9

| | |
|---|---|
| Corn | 63.15 |
| Alfalfa meal | 5.00 |
| Soybean meal (44% C.P.) | 19.00 |
| Meat and bone meal (49% C.P.) | 2.00 |
| Solulac-500 (500 mcg. riboflavin/g.) | 0.50 |
| Limestone | 7.00 |
| Dicalcium phosphate | 2.50 |
| Salt, plain | 0.50 |
| DL-methionine (95% feed grade) | 0.10 |
| Vitamin-trace mineral premix (1552) | 0.25 |

Nineteen hens were fed the diet containing the FG-FLW mixture and 20 hens were fed the control diet. The feeding period was 21 days and feed consumption and egg production were measured during this time. The results are summarized in Table 10.

Table 10

| | Feed consumed, g./hen/day | Production, % |
|---|---|---|
| Control | 116.4 | 31.2 |
| Experimental (Diet No. 2152 with 63.15% swine manure-corn replacing corn) | 106.9 | 34.6 |

We claim:
1. A method of preparing animal feed grain compositions comprising the steps of:
   a. mixing from 2 to 15 parts dry weight basis (dwb) of animal feedlot waste (FLW) with 100 parts dwb of fragmented grain (FG) and an amount of water such that the resulting mixture contains from 35% to 45% moisture; and
   b. aerobically fermenting the mixture resulting from step (a) while submitting said mixture to a tumbling action for a time sufficient to obtain a pH in the mixture of from 4 to 5.
2. A method as described in claim 1 wherein the fragmented grain is corn, wheat, or milo.
3. A method as described in claim 1 wherein the water is present in amounts such that the resulting mixture contains from 38% to 42% moisture.
4. A method as described in claim 1 wherein the pH recited in step (b) is from 4 to 4.5.
5. An animal feed grain composition consisting essentially of the fermented product produced by the method of claim 1.
6. A method of preparing animal feed grain compositions comprising the steps of:
   a. diluting animal feedlot wastes (FLW) with water in amounts and in a manner sufficient to produce an essentially homogenous slurry containing from 3% to 20% solids;
   b. removing an amount of solids from said slurry such that the remaining liquid portion (FLWL) contains from 2% to 15% FLW solids;
   c. mixing the FLWL with fragmented grain (FG) in amounts such that the mixture contains from 2 to 15 parts dry weight basis (dwb) FLWL and 100 parts dwb FG and from 35% and 45% moisture; and
   d. aerobically fermenting the mixture resulting from step (c) while submitting said mixture to a tumbling action for a time sufficient to obtain a pH in the mixture of from 4 to 5.
7. A method as described in claim 6 wherein the fragmented grain is corn, wheat, or milo.
8. A method as described in claim 6 wherein the mixture resulting from step (c) contains from 38% to 42% moisture.
9. A method as described in claim 6 wherein the pH recited in step (d) is from 4 to 4.5.
10. An animal feed grain composition consisting essentially of the fermented product produced by the method of claim 6.